(12) United States Patent
Reaume

(10) Patent No.: US 7,979,293 B2
(45) Date of Patent: Jul. 12, 2011

(54) SYSTEM AND METHOD FOR PRODUCTION SYSTEM OPERATIONS TIMING

(75) Inventor: Daniel J. Reaume, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1686 days.

(21) Appl. No.: 11/238,825

(22) Filed: Sep. 29, 2005

(65) Prior Publication Data

US 2007/0073566 A1    Mar. 29, 2007

(51) Int. Cl.
*G06Q 10/00* (2006.01)
(52) U.S. Cl. .................................................. 705/7.11
(58) Field of Classification Search ....................... 705/7
See application file for complete search history.

(56) References Cited

U.S. PATENT DOCUMENTS 6,577,906 B1 * 6/2003 Hurtado et al. ................... 700/2

OTHER PUBLICATIONS

Caridi, Maria; Cavalieri, Sergio. "Multi-Agent Systems in Production Planning and Control: An Overview". Mar. 2004. Production Planning & Control. vol. 15, No. 2. pp. 106-118.*
Boutilier, Craig. "Sequential Optiimality and Coordination in Multiagent Systems". Jul. 31-Aug. 6, 1999. Proceedings of the Sixteenth International Joint Conference on Artificial Intelligence. vol. 1.*
Peng, Yi; McFarlane, Duncan. "Adaptive Agent-Based Manufacturing Control and its Application to Flow Shop Routing Control". Mar. 2004. Production Planning & Control. vol. 15. No. 2. pp. 145-155.*
Boutilier, Craig. "Multiagent Systems: Challenges and Opportunities for Decision-Theoretic Planning". Winter 1999. AI Magazine. vol. 20. No. 4. pp. 35-43.*

Brennan, Robert W.; O, William. Performance Analysis of a Multi-Agent Scheduling and Control System Under Manufacturing Disturbances. Mar. 2004. Production Planning & Control. vol. 15. No. 2., pp. 225-235.*
Claus, Caroline; Boutilier, Craig. "The Dynamics of Reinforcement Learning in Cooperative Multiagent Systems". 1998. American Associatio for Artificial Intelligence.*
Wang, Yue-Hai; Xu, Chi. "Adaptive Algorithm for Multi-Agent Learning Optimal Cooperative Pursuit Strategy Based on Markov Game". Aug. 26-29, 2004. Proceedings of the Third International Conference on Machine Learning and Cybernetics. pp. 2973-2978.*
Garcia, Alfredo; Reaume, Daniel; Smith, Robert L.; "Fictitious Play for Finding System Optimal Routings in Dynamic Traffic Networks". 2000. Transportation Research Part B, pp. 147-156.*
Benaim, Michel; Hirsch, Morris W.; "Mixed Equilibria and Dynamical Systems Arising from Fictitious Play in Perturbed Games". 1999. Games and Economic Behavior. vol. 36. pp. 36-72.*

(Continued)

*Primary Examiner* — Peter Choi
(74) *Attorney, Agent, or Firm* — John A. Miller; Miller IP Group, PLC

(57) ABSTRACT

Disclosed is a system and method for managing operations of a system. The method includes partitioning the system into a plurality of subsystems. The method further includes, for each subsystem, creating an agent to associate with the subsystem, providing to the agent one or more goals for the subsystem, and providing to the agent an overall objective function for the system. The method also includes using an optimization algorithm involving the agents to manage system operation based on the goals and the overall objective function. The system includes an agent module for providing a set of agents associated with the subsystems, a throughput target module for providing a throughput target for each agent, an objective module for providing, for each agent, a common production throughput objective, and a sampled fictitious play module for providing instructions of a sampled fictitious play algorithm.

14 Claims, 4 Drawing Sheets

OTHER PUBLICATIONS

Chalkiadakis, Georgios.; Boutilier, Craig. "Coordination in Multiagent Reinforcement Learning: A Bayesian Approach". 2003. AAMAS '03.*

Cheung, Yin-Wong; Friedman, Daniel. "Individual Learning in Normal Form Games: Some Laboratory Results". 1997. Games and Economic Behavior. vol. 19. pp. 46-76.*

Berger, Ulrich. "Some Notes on Learning in Games with Strategic Complementarities". Oct. 2003.*

Bowling, Michael; Veloso, Manuela. "An Analysis of Stochastic Game Theory for Multiagent Reinforcement Learning". Oct. 2000. Vida.*

McGlohon, Mary; Sen, Sandip. "Learning to Cooperate in Multi-Agent Systems by Combining Q-Learning and Evolutionary Strategy". 2004. World Conference on Lateral Computing.*

Vidal, Jose M.; "Learning in Multiagent Systems: An Introduction from a Game-Theoretic Perspective". 2003. Adaptive Agents and MAS, LNAI 2636.*

Littman, Michael L.; "Value-Function Reinforcement Learning in Markov Games". 2001. Journal of Cognitive Systems Research. pp. 55-66.*

Williams, Noah. "Stability and Long Run Equilibrium in Stochastic Fictitious Play". Jul. 4, 2002.*

Benaim, Michel; Hirsch, Morris W.; "Learning Processes, Mixed Equilibria and Dynamical Systems Arising from Repeated Games". Oct. 31, 1997.*

Ulrich Berger, "Fictitious play in 2 x n games," Vienna Univ. of Economics Preprint, Feb. 2003, http://econwpa.wustl.edu/eps/game/papers/0303/0303009.pdf.

D. Monderer and L. Shapley, "Fictitious play property for games with identical interests," J. Econ. Th. 68, 258-265, 1996.

A. Garcia et al., "Fictitious play for finding system optimal routings in dynamic traffic networks," Transportation Res. Part B 34, 147-156, 2000.

T. J. Lambert, III et al., A Fictitious Play Approach to Large-Scale Optimization, U. Mich. Tech. Rep. TR02-01, 2002.

* cited by examiner

SYSTEM AND METHOD FOR PRODUCTION SYSTEM OPERATIONS TIMING

TECHNICAL FIELD

The present disclosure relates generally to a system and method for managing operations of a production system. More particularly it relates to a system and method for timing operations of subsystems of the production system to achieve overall system goals and objectives.

BACKGROUND OF THE DISCLOSURE

In large scale manufacturing and assembly plants, such as those used in automobile manufacturing, hundreds of machines and their machine operators may work simultaneously. In a large production environment, the production line may include miles of conveyors. The plant itself may be millions of square feet. An increase in the precision of production timing and/or control may provide better resource allocation. Accordingly, processes and controls that keep the line moving may increase production and reduce expenses.

A plant's hours of operation may include three shifts. For example, at the beginning of the day, oftentimes there is work in progress left at the end of the previous shift. Work in progress includes but is not limited to units of production, pallets, carriers, product, parts and units of production and items of production. Throughput is the number of items produced or processed during a period of time.

Along the many sections of conveyor of a large plant, there may be a plurality of sections that are empty or full. A buffer is storage area such as a conveyor, transport (i.e., forklift, cart, truck, etc.), silo between stations (either manual or automatic), or simply a place on the floor. A buffer generally can hold parts in excess of standard in-process stock, and provides capability to cover potential production losses due to downtime, lost time, and quality issues. Here, standard in-process stock means the minimum number of parts on the line required to maintain continuous flow of products through the manufacturing line at the intended line speed.

In a single shift, a machine station at an automotive plant may process up to hundreds and even thousands of products. The conveyor belt may move at several feet per second. The line can move fast and operations can be complex. In a single automotive assembly line, there may be hundreds of machine stations and zero or more machine operators per station. Stopping a unit of production for staging or choosing to let the unit of production move on a conveyor belt under the continuous flow model can cause problems. Since stopping a unit of production from moving takes typically 0.5 seconds over take time, units of production can become bottlenecked quickly and downstream machines can be starved. Over the course of processing 1000 units of production per shift an ad hoc and manual approach to shutting down machines, stations, or buffers may mean substantial losses in time and resources.

A primary goal of operating a production system is to maximize throughput by keeping the system running as much as possible. Competing with this goal is the need to periodically shut down parts of the system to allow for maintenance, working training, team meetings, or other tasks. Facilitating such stoppages, buffers can separate production systems into subsystems, allowing downstream and upstream subsystems to continue to operate for a while when a subsystem is temporarily shut down. In addition, buffers may themselves be considered as subsystems whose states may be monitored and managed. The separation of a production system into such subsystems can create dynamic and temporal dependencies between subsystems and make it difficult to optimize the timing and duration of shutdowns to achieve a set of goals while minimizing lost throughput.

Processes and systems that improve the ability to perform, with minimal throughput loss and in a timely manner, tasks requiring subsystems be shut down such as preventive maintenance, training, team meetings, and calibration accordingly may increase overall production system effectiveness and may also enable subsystems to coordinate their end-of-day shutdown in a manner that can accommodate maintenance requirements while minimizing the associated throughput losses.

DETAILED DESCRIPTION

In accordance with the exemplary embodiments, the method and system provide an engineering tool for production system operations timing. In this disclosure a production system may include a manufacturing system, an assembly system, or any other system for production or processing of items, including information, where the system can be adapted to partitioning into subsystems to meet system goals.

Figure 1:
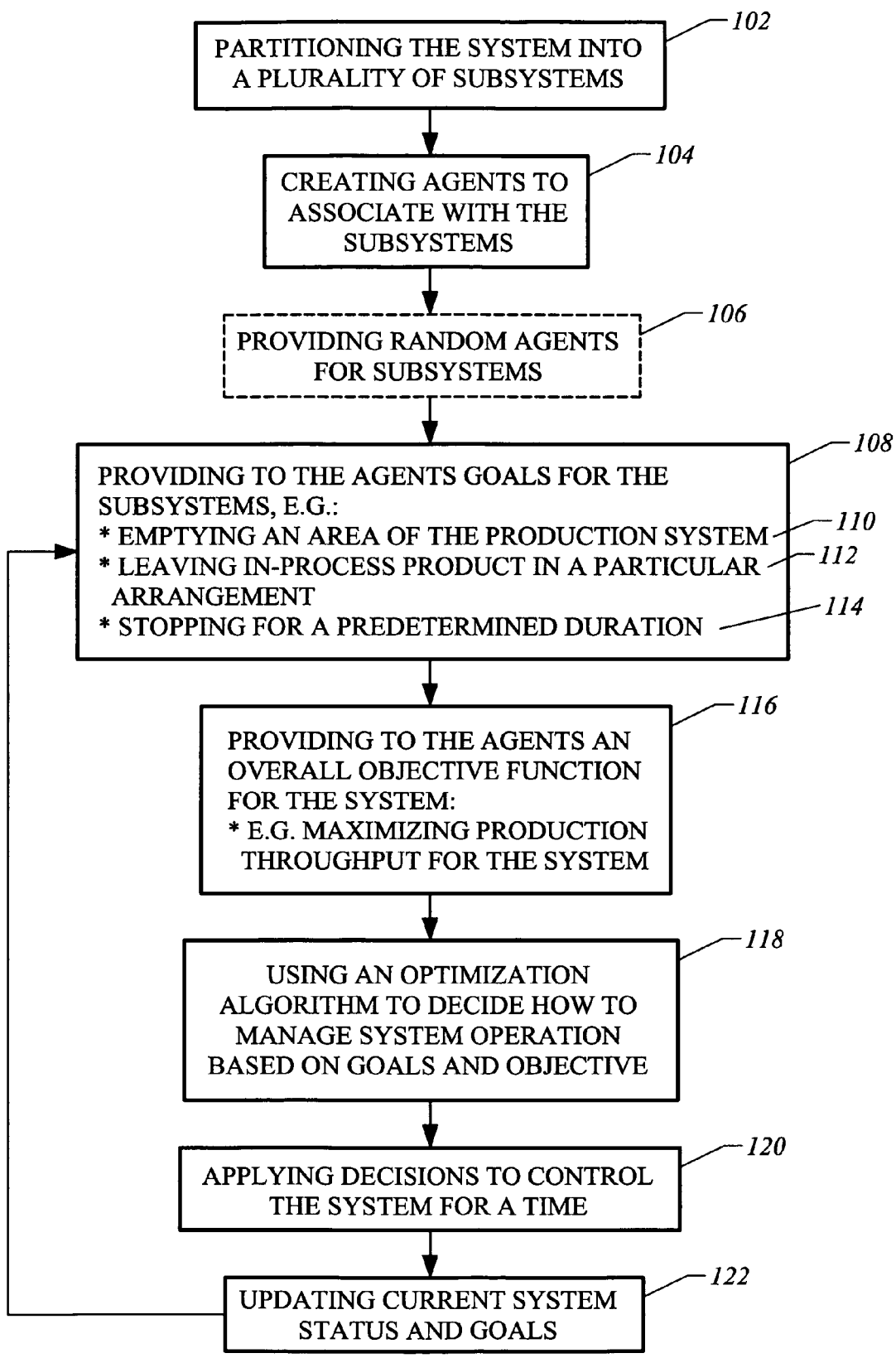
FIG. 1 is a flowchart showing steps of an embodiment as described in detail below.

FIG. 1 shows steps of an embodiment as described in detail below. A method for managing the timing of subsystem shutdowns, in a system and method for operations timing in a production system, includes partitioning the production system into subsystems 102, and creating agents to associate with the subsystems 104. As an option, random agents may be provided for subsystems 106, as well. Agents are described in detail below. Iterative steps also can be executed, such as providing goals to the agents 108, providing an overall objective function 116, using an optimization algorithm to decide how to manage system operation 118, applying the result from using the optimization algorithm 120, and updating current production system status and goals 122 to continue the iteration. These iterative steps also are discussed in detail below.

As described herein, the system, method, and apparatus may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Returning now to FIG. 1, the production system may be partitioned into a plurality of subsystems 102. A subsystem can include an individual machine of the production line, or a subsystem may include a group of machines arranged into stations. The group may include machines carrying out related operations, or may include machines arranged to work on the same production unit simultaneously or sequentially. A subsystem may also include a buffer. A subsystem may also include a zone consisting of multiple stations, machines, and/or buffers linked together. In this discussion N may be used to denote the number of subsystems.

Agents are created 104 for association with the subsystems. Typically one agent can be created for each subsystem. Optionally, random agents may be created 106 and are discussed below. An agent may be adapted to independently decide when to operate and when to shut down a subsystem, and may be configured to select among predetermined options. Moreover, production operations timing decisions may also include deciding when to slow down operations of a subsystem, and when to speed up operations of a subsystem. Thus, an agent may be configured to decide on the operational status of its associated subsystem along a continuum from stopped to operating at full design speed. Alternatively, the operational status of an associated subsystem may possess only the binary values "stopped" or "operating." Thus, a speed reduction of a subsystem by an agent, or a decision by an agent to reduce the speed of a subsystem, may also encompass herein a shutdown of a subsystem by an agent. Similarly, a speed up of a subsystem by an agent, or a decision by an agent to increase the speed of a subsystem, may also encompass herein a startup of a subsystem by an agent, or bringing subsystem speed up to full design speed. Agents are thus adapted to making decisions as to the number, time of occurrence, and duration of stopping times or speed reduction times for their corresponding subsystems.

An agent may be realized in a software application loaded into memory and executed by a processor, as will be discussed further below in connection with FIG. 4, or may be implemented in hardware. An agent may also be referred to herein as a "real agent" to distinguish from a "random agent," to be discussed below. Thus, in this discussion N may also be used to denote the number of "real" agents.

Typically each of the N agents makes decisions with a view to optimizing a common objective of maximizing total system value, with consideration given to subsystem goals. System value is generated in two ways. First, system value may be generated by processing products, for example, for each car completed, $1000 of value may be generated. Over shorter time periods, it may be desirable to measure system value more precisely, based on how much processing has been completed on items in the system. For example, a vehicle that has been processed by seven out of ten stations may be considered to yield 70% of the $1000 of system value of a finished vehicle, or $700. A second way of generating system value may be by achieving specific system configurations that enable maintenance, testing, or other activities. Examples of achieving specific system configurations may include, for example, shutting down for fifteen minutes between 2 pm and 4 pm to allow for changing of cutters, and, as another example, ensuring that at the end of the day when the shift ends, a specific buffer contains exactly six vehicles, one in each of six styles, in a particular sequence.

Since the subsystems are linked together in a production system, a decision to stop or slow down by one agent may impact subsystems in addition to the one associated with the agent. Stopping or slowing down one subsystem may lead to starving of downstream subsystems, or blocking of upstream subsystems. A sequence of stopping times and starting times adopted by an agent is herein referred to as a policy. It is understood that a policy can also include a sequence of agent decisions in an embodiment in which the operational status of a subsystem controlled by an agent can be intermediate between stopped and operating at full design speed. A policy may be expressed in absolute terms, for example, stop at 8 am, start at 9 am. A policy may also be expressed in terms relative to other agents, for example, stop five minutes after the downstream agent, start ten minutes after the downstream agent. A policy may include both absolute and relative expressions of start times and stop times. A policy may take other forms as well.

As discussed immediately above policies are sequences of stopping times and starting times adopted by an agent. Discussed below in more detail are goals, which are used to assign a value to achieving a particular system state at specific times and/or during specific time intervals. Also discussed below is a system function which describes the total value yielded by the system. The system function may incorporate production throughput as well as meeting of subsystem goals. For example, one system function might be the sum of $1000 per car produced as scheduled minus $100 per car produced using overtime plus $1000 per preventive maintenance task achievable due to the achievement of a corresponding subsystem goal.

In another example, a system function $f$ includes a value of $1000 per shutdown goal or speed reduction goal achieved (such as to enable preventive maintenance or a team meeting), minus $3000 per car not built on the day it was scheduled due to shutting down early (to achieve the aforementioned goals), minus an additional $200 per unscheduled car built on overtime (because the system overproduced slightly to meet more shutdown goals).

As mentioned above, in an optional step 106, random agents may be created for subsystems. A random agent may be provided to simulate unforeseen events such as equipment failures. A random agent may act to simulate stopping an associated subsystem, where the stopping time and duration may be chosen according to one or more probability distributions. Such probability distributions may be derived from historical subsystem performance data. For example, one might generate stopping and starting times by using historical information on the mean time between failures (MTBF) and mean time to repair (MTTR) of the equipment corresponding to the agent. Addition of such random agents may impact the policies of the real agents by encouraging real agents to "hedge" against the risk of unforeseen events. This may lead to adoption of more realistic policies by the agents.

An iterative process may begin with the agents created in step 104 being provided with one or more goals for the associated subsystem 108. For example, an agent may be provided with a goal of emptying an area of the production system 110. The area may include a buffer, a machine, a station, or a combination of one or more of each of these. Another example of a goal that may be provided to an agent would be leaving in-process product in a particular arrangement in the production system 112. Still another goal may be stopping a station for a predetermined duration 114, for example, for a meeting or training involving station personnel. One or more goals provided to an agent may be considered as a throughput target for the agent. The throughput target for each agent thus incorporates the goals for the subsystem associated with the agent.

The agents may in addition be provided with an overall objective function for the system 116. Such an objective function may be, for example, an objective of maximizing production throughput for the system. Another example of an objective function may be maximizing production throughput for the system for shift #1, while jointly maximizing preventive maintenance task completion during shift #2. The overall objective function for the system may also be referred to herein as a common production throughput objective for the agents.

An optimization algorithm may be used 118 to decide how to manage system operation based on the goals and objective function provided to the agents. The goals and objective function may be combined into a system function $f$ whose value may depend on the set of policies adopted by the agents. The system function $f$ provides a measure of the system value described above. For example, $f$ may be defined as the sum of the values of all goals achieved, plus the value of all units that finished production. In another embodiment in which evaluation of $f$ may be done through simulation, $f$ may be defined to be the minimum over, for example, 10 simulations, of the sum of values of all goals achieved, plus the value of all units that finished production. It will be appreciated that $f$ may incorporate measures of risk and stochasticity as well. The results of simulations may, for example, be weighted based on the perceived risk-adjusted utility of the value received. For example, the value of $f$ may be a utility-weighted average of the values generated over a sequence of simulation runs. The unfavorable simulation values may be weighted more heavily than the favorable ones to reflect risk-aversion.

In one embodiment, the agents participate in a sampled fictitious play algorithm in which agents iterate over steps of policy selection and evaluation of the system function $f$, whose value depends on the policies selected by the agents. In another embodiment, the sampled fictitious play algorithm may include adopting an initial policy based on a previously chosen joint policy. These two embodiments are described in more detail below in connection with FIG. 2. In still another embodiment, a heuristic is applied to develop an algorithm for policy selection for an agent. The heuristic algorithm is described more fully below in connection with FIG. 3.

The agents' decisions resulting from use of the optimization algorithm are applied to control the production system for a time 120. The time period during which the decisions are applied may be predetermined to be, for example, 5 minutes, 1 hour, the duration of a work shift, or another convenient time period. Alternatively, the time period used may be so short as to provide substantially continuous control of the production system. In another embodiment, the time period during which the decisions are applied may depend on user input, for example, management decisions in real time. Moreover, the time period in which decisions are applied may depend on events taking place in the production system. For example, a downed machine or station may lead to return of some system control functions to manual control.

The current status of the production system may be monitored, and system goals may be updated in a step 122. The update may include, for example, updating of the positions of production units in the system and the failure status of all equipment in the system. The update may also include the likelihood of imminent failure of equipment in the system. For example, due to real-time monitoring of vibration signatures, it may be known that a bearing may fail soon in a particular machine.

The updated information guides the provision of new and/or updated goals to the agents to close the iteration loop begun at step 108. Thus, goals already achieved may be eliminated, new goals may be added, and/or existing goals modified. The updated information may also guide changes to the objective function or overall system function. In these ways, updated information obtained through monitoring the current status of the production system may lead to changes propagated to the overall system function $f$.

Figure 2:
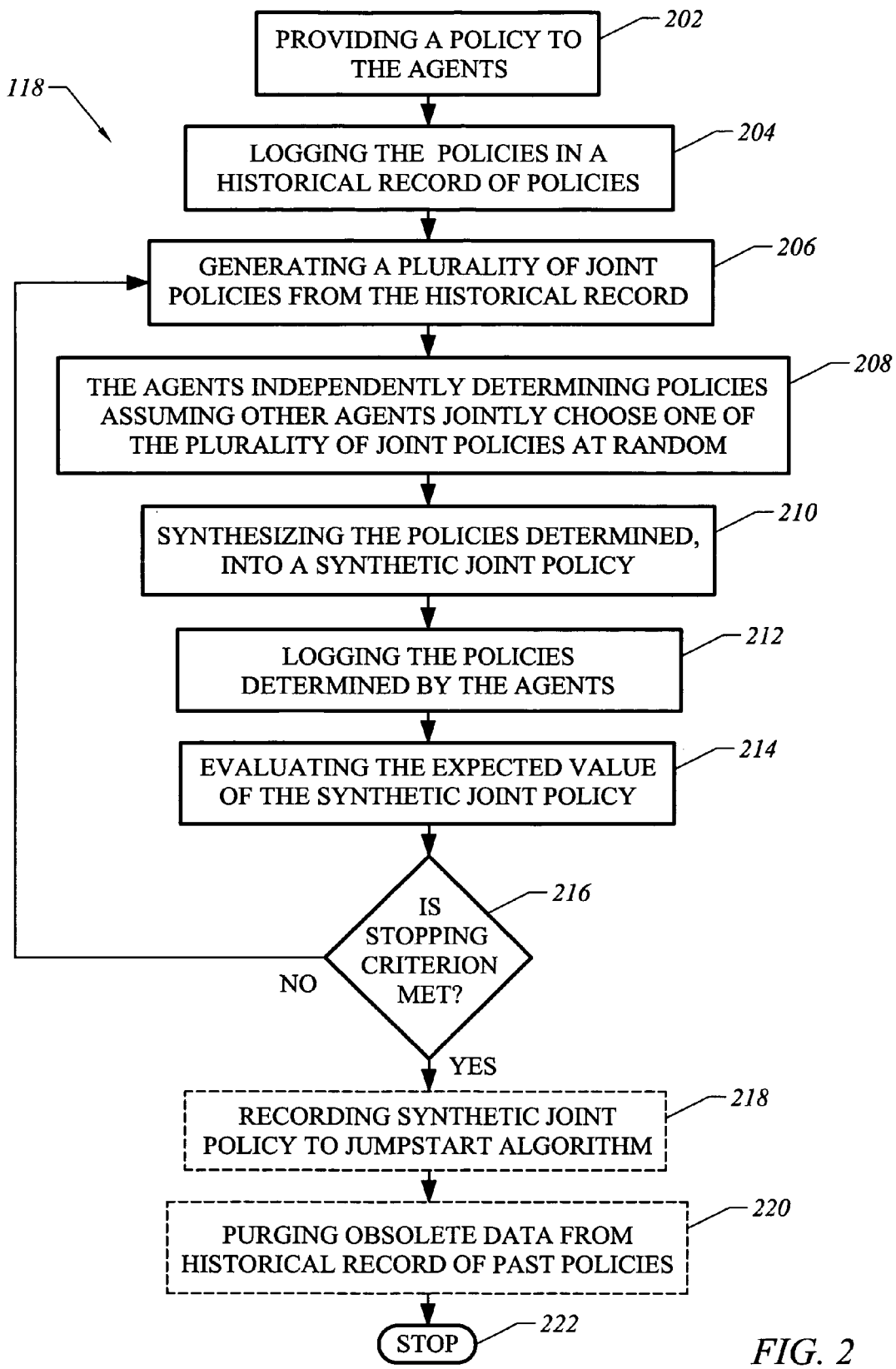
FIG. 2 shows more detail of the sampled fictitious play algorithm discussed in connection with step 118 of FIG. 1.

FIG. 2 shows more detail of the sampled fictitious play algorithms discussed above in connection with step 118 of FIG. 1. In fictitious play, agents can cooperate implicitly (rather than explicitly collaborating) by the device of sharing information about what they are likely to choose as policies. For example, if agent A needs to shut down for ten minutes for a goal to be achieved and knows that the next agent downstream, agent B, will shutdown for ten minutes at 1 pm, then it would be optimal for agent A to shutdown around 1 pm. The interactions between subsystems, and hence between agents, are bi-directional. If agent A changes its policy in response to a predictive calculation of the actions of agent B, then agent B can change its policy to respond in turn to the changed policy of agent A.

A fictitious play optimization algorithm may explicitly recognize the reciprocal nature of agents' decisions by viewing the optimization problem as a "game" that is repeatedly "played" by agents. In a round of the game, an agent may choose a policy that can maximize expected value assuming that all other agents ("players") choose policies with probabilities in accordance with their historically selected policies. For example, if in five rounds of the game, agent B twice chose policy #1 (e.g., to stop at 2 pm and restart at 3 pm), and three times chose policy #2 (e.g., to stop at 10 am and restart at 11 am), then agent A would choose its policy on the assumption that there is a 40% chance that agent B would use its policy #1 and a 60% that it would instead use its policy #2.

In fictitious play, agents may optimize their own decisions. Thus the task of jointly optimizing policies over the agents is broken down into many much simpler tasks. In practice, relatively few (<20) iterations may be generally required to obtain solutions to the overall task, although the algorithm may not always converge to a true optimum. In general, convergence may not be necessary, as the error in the task data is typically far more significant than the algorithm's deviation from optimality. It will be appreciated that each of the smaller tasks may be completed in many different ways.

Implementation of fictitious play as described above may be too computationally intensive based on the exorbitant number of combinations of policies that must be considered. For example, if each of ten agents chose a different policy in each of ten iterations, then an agent would have to consider one billion (ten raised to the ninth power) different combinations of policies of other agents when deciding on its own policy.

To resolve the computational intensity issue, a Sampled Fictitious Play (SFP) algorithm may be used. Such an algorithm is like the fictitious play algorithm except that in an iteration (that is, a "play" of the "game"), an agent considers only a small number (called the sample size) of joint policies of other agents, and chooses a policy that maximizes expected value assuming the other agents are equally likely to select one policy out of this small set of policies. The joint policies to consider are generated via random sampling over past policies. For example, suppose it is currently the 10th iteration of SFP, the system involves ten agents, and the sample size is three. For each agent a of the ten agents, three random numbers are drawn from the set {1, . . . , 9}, each number having equal probability. In this discussion let these be denoted r(a,1), r(a,2), r(a,3), where a varies from 1 to 10. The first sampled joint policy is obtained by choosing for agent #1 the policy that agent #1 used in iteration r(1,1), choosing for agent #2 the policy that agent #2 used in iteration r(2,1), . . . , and choosing for agent #10 the policy that agent #10 used in iteration r(10,1). In general, the kth sampled joint policy is obtained by choosing for agent #1 the policy that agent #1 used in iteration r(1,k), choosing for agent #2 the policy that agent #2 used in iteration r(2,k), . . . , and choosing for agent #10 the policy that agent #10 used in iteration r(10,k).

Fictitious play and SFP may operate satisfactorily if one or more agents choose strategies randomly and independently of the other agents. As discussed above, to each "real" agent, one might create another such "random" agent to simulate unforeseen events such as equipment failures. The addition of such random agents will impact the policies of the real agents by encouraging them to "hedge" against the risk of unforeseen events, tending to lead to substantially realistic policies.

A policy may be provided to an agent 202. The policy may be considered as an initial policy. To speed convergence, this initial policy may be based on experience, expert opinion, or other grounds to ensure that it is reasonably sound. However, it is understood that it is not essential to base an initial policy on experience, expert opinion, or other grounds as just described. In the absence of any additional information, one initial policy may be for an agent to not schedule any stops. Another initial policy may be for an agent to use a previous policy used by the agent, for example in a situation in which the method may be restarted. Optionally, current system information may be retrieved for use in evaluating the expected value of a joint policy, as described below.

The initial policies of the agents may be logged in a database or otherwise recorded 204. In this way a historical record of policies employed by the agents may be maintained in a repository. An iteration count, Iter, may be set equal to 1, to initialize a forthcoming iteration over episodes of sampled fictitious play in which the agents participate. In another embodiment, the iteration count, Iter, may be set equal to the number of synthetic joint policies stored in the historical record. Synthetic joint policies are discussed below.

The historical record may be used in a step 206 of generating a plurality of joint policies from the historical record. By a joint policy it is meant that an ordered set of N policies is selected, one policy for each agent, where an agent may be assumed to adopt its associated policy simultaneous with the other agents' adoption of their policies. A plurality of joint policies may be used, rather than using a single joint policy, in order to provide a sampling of joint policies that may be adopted by the agents.

A joint policy may be generated, for example, by combining together policies of agents. In this discussion s is used to denote the maximum sample size of random policies to use in an iteration. A number q is defined at each iteration as the minimum of s and Iter. Thus, at the first iteration, q=1. In subsequent iterations the value of q increases by 1 with each iteration until it reaches a value of s, where it remains for subsequent iterations. Denoting a joint policy by p, a random joint policy may be generated by combining policies randomly selected for each agent. A policy is randomly selected for agent a, for example, by first choosing a random integer, r, between 1 and Iter, inclusive. Then the policy employed by agent a in iteration r is used as its policy in the random joint policy being generated. Combining together the randomly selected policies of each of the agents provides a random joint policy p. Continuing this process for each of the q random joint policies to be created results in a set of q random joint policies, Q={p(1), . . . , p(q)}. The random joint policies in Q may be denoted herein as sample joint policies or random sample joint policies. The random joint policies in Q may also be denoted herein as randomly generated strategies.

In a step 208, each "real" agent individually develops a policy that approximately maximizes the expected value of $f$ assuming all of the other agents will jointly employ one of the randomly generated strategies in Q, each such sample joint policy having equal probability. In more detail, an agent selects, for example through a search algorithm, a policy that approximately maximizes the expected value of $f$, discussed above. For example, define a current agent to be each of the N agents in turn, and denote the current agent in this discussion as agent j. The optimization algorithm selects a policy x for agent j that (approximately) maximizes the average value of $f(x,p(i)\_j)$ where i varies from 1 to q and where $(x,p(i)\_j)$ denotes the joint policy constructed by assigning to all agents other than agent j their policy from the sample joint policy p(i) and assigning policy x to the agent j. The optimization algorithm may accomplish the step of selecting a policy x as just described, for agent j, using a wide variety of optimization approaches, such as dynamic programming, simulated annealing, genetic algorithms, or even pure enumeration (i.e. trying all possibilities).

All of the individual policies generated in step 208 may be combined together, along with the policies of the random agents from the current iteration, to generate a single joint policy 210, herein called a synthetic joint policy. For each real agent, the policy generated in step 208 may be recorded, updating the historical record of the past policies employed by each agent 212.

The expected value of $f$ when the set of agents is assumed to adopt the synthetic joint policy of step 210 may be evaluated 214. Current system information, as previously mentioned, may be used, along with the goals and overall objective function, in evaluating the expected value of $f$ for the synthetic joint policy. In a step 216, a stopping criterion may be checked. The stopping criterion may be based on the value computed in step 214, for example, the computed value may be compared with a predetermined number for the expected value of the synthetic joint policy. The stopping criterion may instead or in addition be based on whether an iteration limit is reached. The stopping criterion may also include some other trigger condition. If no stopping criterion is met, the value of Iter is incremented by 1 and the method returns to step 206.

If a stopping criterion is met at step 216, the SFP algorithm may stop 222. Prior to stopping, an optional step of recording the synthetic joint policy in a repository may be taken 218. Recording the synthetic joint policy may provide for jump-starting the SFP algorithm in a subsequent execution, by supplying a set of policies to be adopted by the agents in step 202.

In another optional step 220, obsolete data may be purged from the historical record of past policies. Purging may adapt the method to current production system conditions.

Figure 3:
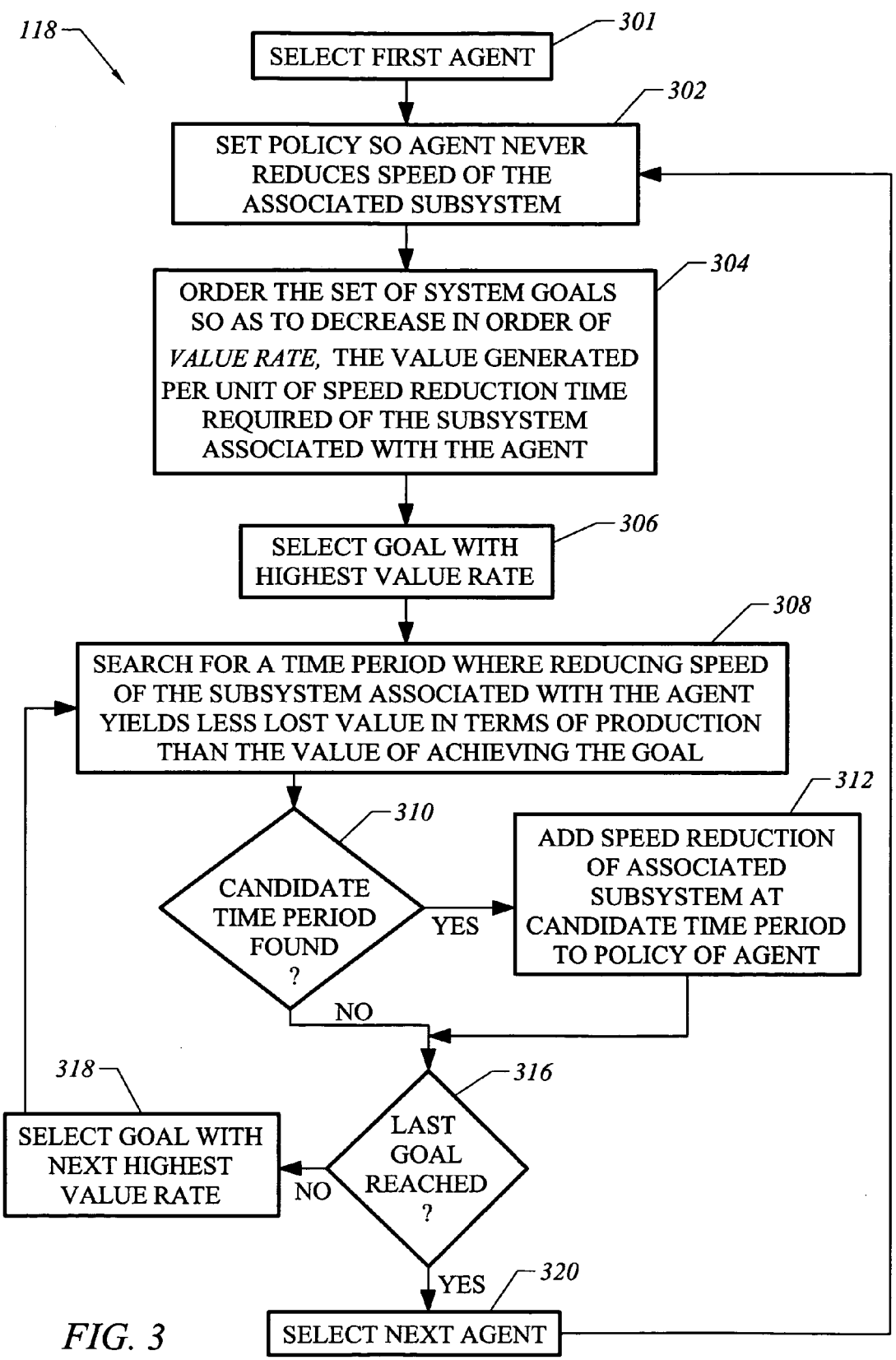
FIG. 3 shows details of the heuristic algorithm discussed above in connection with step 118 of FIG. 1.

FIG. 3 shows detail of the heuristic algorithm discussed above in connection with step 118. An iteration over agents is started at a step 301. Each of the N agents may be provided with a policy of never shutting down or reducing speed of its associated subsystem 302. The policy may be considered as an initial policy. In this embodiment all the agents are provided with the same initial policy. In another embodiment, a set of different initial policies may be provided to the agents. Some of the agents may also share the same policy.

The goals provided to the agents may be ordered 304 so as to decrease in order of a value rate. The value rate is defined as the value generated per unit of shutdown time required to meet the goal of the subsystem associated with the agent. More generally, the value rate may be defined for situations in which a goal may be met by a slowdown of an associated subsystem, instead of a complete shutdown.

The heuristic algorithm includes a step 306 of selecting a goal, associated with the current agent, which has the highest value rate. In a step 308, a search is performed to find a time period where shutting down or reducing the speed of the subsystem associated with the agent yields less lost value in terms of production than the value of achieving the goal and when there are sufficient resources available (such as maintenance labor) in that time period to accomplish the goal. A value of achieving the goal may be identified. The search may require a deterministic simulation to accurately model system interdependencies and to reflect the sequence of randomly generated events.

A query is made 310 as to whether a candidate time period was found. If yes, the shutdown or speed reduction of the associated subsystem at the candidate time period is added to the policy of the agent 312. Whether or not a candidate time period was not found, a query is made 316 as to whether the last goal has been selected. If yes, then the heuristic algorithm returns to step 302 for the next agent. If not, then the goal with the next highest value rate, and associated with the current agent, is selected for consideration 318, and the heuristic algorithm returns to step 308 to search for a candidate time period. The heuristic algorithm finishes when the iteration over agents completes.

Briefly returning to FIG. 1, it will be appreciated that instead of including random agents in the method of FIG. 1 at step 106, random factors can be incorporated in the evaluation of the system function $f$. For example, the simulation required for the heuristic algorithm discussed in connection with FIG. 3 might incorporate random failures.

Figure 4:
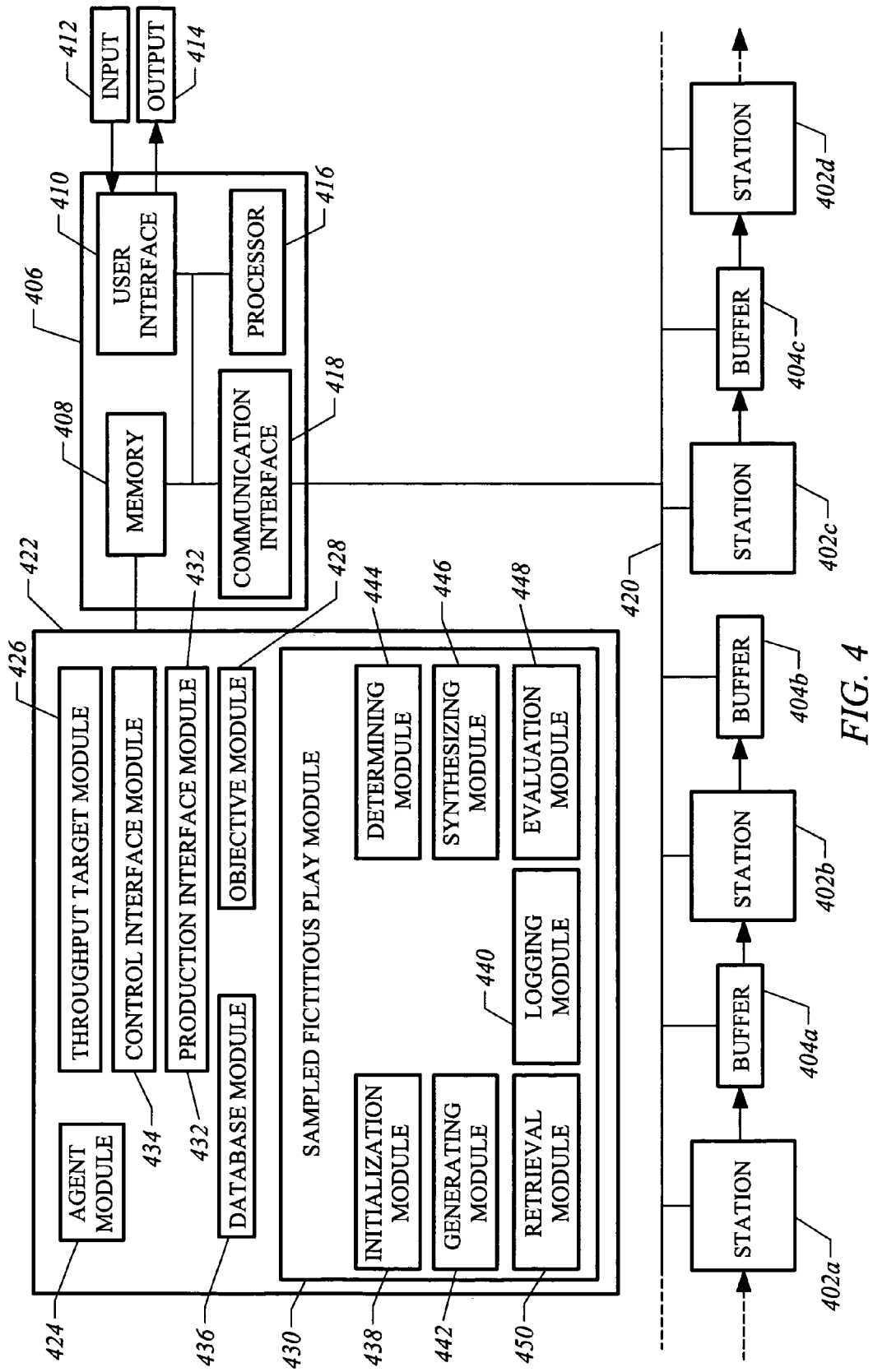
FIG. 4 shows a system according to one embodiment for managing the timing and duration of speed reductions or shutdowns of subsystems of a production system.

FIG. 4 shows a system according to one embodiment for managing the timing and duration of shutdowns or speed reductions of subsystems of a production system. A production system is shown schematically with subsystems that include stations 402a-d and buffers 404a-c. The production system may also include subsystems that include single machines. Arrows between stations and buffers are intended to show the flow of in-process product through the production system. It will be appreciated that the production system need not have a single flow of product. For example, parallel production lines are possible in the production system. It will also be appreciated that the production system may include zones made up of combinations of stations, buffers, and/or machines, and that in-process product flow may depend on the configuration of the zones, stations, buffers, and machines of the production system.

FIG. 4 also shows a computing device 406 including a memory 408, a user interface 410 to receive input 412 and deliver output 414, a processor 416, and a communication interface 418. Communication interface 418 is in communication with the subsystems 402a-d, 404a-c, and other subsystems of the production system through network 420. Network 420 may be a wireless or wired local area network, a wide area network, or may use any other network technology to effect communication between the subsystems of the production system and computing device 406.

Memory 408 may include storage media such as magnetic or optical disks as well as computer RAM, CMOS devices, or any other memory technology as is known. Memory 408 includes software modules 422 which may be executed by processor 416. The software modules may include an agent module 424, a throughput target module 426, an objective module 428, a sampled fictitious play module 430, a production interface module 432, a control interface module 434, and a database storage and retrieval module 436.

Agent module 424 provides a set of agents associated with the subsystems, each agent corresponding to one subsystem. The throughput target module 426 provides a throughput target for each agent. The throughput target for each agent incorporates the goals for the subsystem associated with the agent.

For example, as previously discussed, an agent may be provided with a goal of emptying an area of the production system. The area of the production system may include a buffer, a machine, a station, or a combination of one or more of each of these. Another example of a goal that may be provided to an agent and incorporated into a throughput target for the agent would be leaving in-process product in a particular arrangement in the production system. Still another goal, as described above, may be stopping a station for a predetermined duration, for example, for a meeting or training involving station personnel. Each of these goals, as well as others that may be provided to an agent, may be incorporated into a throughput target for the agent. It will be appreciated that a throughput target is separate from a common production throughput objective.

Objective module 428 provides, for each agent, a common production throughput objective. The common production throughput objective may include, for example, daily production of a predetermined number of production units. The common production throughput objective may instead or in addition include an objective of maximizing production throughput. The common production throughput objective is combined with the set of subsystem goals, as previously described, into an overall system functions $f$. The system function $f$ may therefore include, for example, maximizing production throughput subject to accomplishment of subsystem goals. The system function $f$ may alternatively include, for example, maximizing production throughput with consideration given to subsystem goals, but one or more subsystem goals may not be met.

Sampled fictitious play module 430 provides instructions of a sampled fictitious play algorithm. Production interface module 432 provides for monitoring a status of the production system. Control interface module 434 provides for controlling a subsystem of the production system. Subsystem shutdowns or reductions in speed may thereby be managed by monitoring the status of the production system as provided by production interface module 432, and by controlling the subsystems of the production system as provided by control interface module 434. Database storage and retrieval module 436 for storing and retrieving historical records of policies previously determined by agents.

In more detail, sampled fictitious play module 430 includes an initialization module 438 for providing a policy to the agents. Such a policy may be considered as an initial policy. Sampled fictitious play module 430 also includes a logging module 440 for logging the policies of the agents to create a historical record of policies. Sampled fictitious play module 430 further includes a generating module 442 for generating a plurality of sample joint policies of the agents from the historical record and a determining module 444 for an agent to independently determine a policy assuming other agents jointly choose one of the plurality of sample joint policies at random. The sampled fictitious play module also includes a synthesizing module 446 for synthesizing the policies determined by the agents into a synthetic joint policy, and an evaluation module 448 for evaluating the expected value of $f$ for the synthetic joint policy based on the throughput targets and the common production throughput objective. Sampled fictitious play module 430 may also include a retrieval module 450 for retrieving current production system information, which may then be used by the evaluation module in evaluating the expected value of $f$ for the synthetic joint policy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for managing operations of a production system, comprising:
    partitioning the system into a plurality of subsystems;
        for each subsystem, at least one computing device, coupled to a memory executing the steps of:
        creating an agent to associate with the subsystem;
        providing to the agent one or more goals for the subsystem; and
        providing to the agent an overall objective function for the system; and
    executing, using the at least one computing device, an optimization algorithm involving the agents to manage system operations based on the goals and the overall objective function, wherein the optimization algorithm implements a sampled fictitious play algorithm that includes:
        providing a policy to the agents;
        logging the policies of the agents to maintain a historical record of policies;
        and
        in successive iterations:
            generating a plurality of joint policies of the agents from the historical record;
            the agents independently determining policies assuming other agents jointly choose one of the plurality of joint policies at random;
            synthesizing the policies determined by the agents into a synthetic joint policy;
            adding to the historical record by logging the policies determined by the agents; and
            evaluating the expected value of the synthetic joint policy based on the goals and the overall objective function;
            wherein iterations continue until a stopping criterion is met.

2. A method as described in claim 1, wherein providing to the agent an overall objective function for the system comprises:
    providing to the agent a maximization of production throughput for the system.

3. A method as described in claim 1, further comprising:
    providing a random agent for a subsystem;
    wherein the random agent affects operation of the subsystem according to a probability distribution.

4. A method as described in claim 1, wherein the stopping criterion comprises:
    reaching a predetermined iteration limit.

5. A method as described in claim 1, wherein the sampled fictitious play algorithm further includes:
    retrieving current system information.

6. A method as described in claim 1, wherein the stopping criterion comprises:
    achieving a predetermined number for the expected value of the synthetic joint policy.

7. A method as described in claim 5, further comprising:
    recording a joint policy created during use of the sampled fictitious play algorithm to produce a recorded joint policy having a corresponding individual policy for the agents;
    wherein providing a policy to the agents comprises:
        providing the corresponding policy of a recorded joint policy to the agents.

8. A method for optimizing the timing and duration of speed reductions of a plurality of subsystems of a production system, comprising performing, by at least one computing device, coupled to a memory, the steps of:
    providing a set of agents associated with the subsystems, one agent corresponding to one subsystem;
    providing a throughput target for the agents; and
    providing a common production throughput objective for the agents;
    wherein an agent determine policies and participates in a sampled fictitious play algorithm to manage system speed reductions based on the throughput targets and the common production throughput objective, the sampled fictitious play algorithm comprises:
    providing a policy to the agents;
    logging policies of the agents to maintain a historical record of policies; and
    in successive iterations:
        generating a plurality of joint policies of the agents from the historical record;
        the agents independently determining a policy assuming other agents jointly choose one of the plurality of joint policies at random;
        synthesizing the policies determined by the agents into a synthetic joint policy;
        adding to the historical record by logging the policies determined by the agents; and
        evaluating the expected value of the synthetic joint policy based on the throughput targets and the common production throughput objective;
        wherein iterations continue until a stopping criterion is met.

9. A method as described in claim 8, wherein the agents are configured to manage system operations by making decisions as to the number, time of occurrence and duration of stopping times for its corresponding subsystem.

10. A method as described in claim 8, wherein the sampled fictitious play algorithm further includes:
    retrieving current production system information.

11. A system for managing the timing and duration of speed reductions of a plurality of subsystems of a production system, the system including at least one computing device coupled to a memory having stored thereon a plurality of modules;
    an agent module for providing a set of agents associated with the subsystems, one agent corresponding to one subsystem;
    a throughput target module for providing a throughput target for an agent;
    an objective module for providing, for the agents, a common production throughput objective; and a sampled fictitious play module for providing instructions of a sampled fictitious play algorithm wherein the agents provided by the agent module participate in the sampled fictitious play algorithm to manage system speed reductions based on the throughput targets provided by the throughput target module and the common production throughput objective provided by the objective module, and wherein the sampled fictitious play module includes:
an initialization module for providing a policy to the agents
a logging module for logging the policies of the agents to create a historical record of policies
a generating module for generating a plurality of joint policies of the agents from the historical record
a determining module for the agents for independently determining a policy assuming other agents jointly choose one of the plurality of joint policies at random;
a synthesizing module for synthesizing the policies determined by the agents into a synthetic joint policy; and
an evaluation module for evaluating the expected value of the synthetic joint policy based on the throughput targets and the common production throughput objective;
wherein the logging, generating, determining, synthesizing, and evaluation modules are executed iteratively until a stopping criterion is met.

12. A system as described in claim 11, further comprising:
a production interface module for monitoring a status of the production system; and
a control interface module for controlling a subsystem of the production system;
wherein system speed reductions are managed by monitoring the status of the production system, and by controlling the subsystem of the production system.

13. A system as described in claim 11, wherein the production system has current production system information and the sampled fictitious play module further comprises:
a retrieval module for retrieving current production system information;
wherein the evaluation module is further for evaluating the expected value of the synthetic joint policy based on the throughput targets, the common production throughput objective, and the current production system information.

14. A system as described in claim 13, further comprising:
a database storage and retrieval module for storing and retrieving historical records of policies previously determined by agents;
wherein the initialization module is further for providing a policy to the agents by retrieving a historical record of a policy previously determined by the agents.

* * * * *